United States Patent [19]
Hayashi et al.

[11] Patent Number: 6,073,059
[45] Date of Patent: *Jun. 6, 2000

[54] METHOD OF STORING DATA IN INTERNAL STORAGE DEVICE IN A MOLDING MACHINE CONTROLLER AND INTERNAL STORAGE DEVICE CARRYING OUT THE SAME METHOD

[75] Inventors: Shoji Hayashi, Numazu; Kiyoshi Sasaki, Mishima, both of Japan

[73] Assignee: Toshiba Kikai Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/814,169

[22] Filed: Mar. 7, 1997

[30] Foreign Application Priority Data

Mar. 7, 1996 [JP] Japan .................................. 8-050480

[51] Int. Cl.[7] ...................................................... G06F 19/00
[52] U.S. Cl. .............................. 700/204; 700/2; 700/49; 700/83; 700/181
[58] Field of Search ............................... 264/40.1; 700/2, 700/49, 83, 181, 204

[56] References Cited

U.S. PATENT DOCUMENTS

| | | | |
|---|---|---|---|
| 4,745,541 | 5/1988 | Vaniglia et al. | 364/141 |
| 4,805,112 | 2/1989 | Neko | 364/475.05 |
| 5,229,952 | 7/1993 | Galloway et al. | 364/475.05 |
| 5,539,650 | 7/1996 | Hehl | 364/475.05 |

*Primary Examiner*—William Grant
*Assistant Examiner*—McDievnel Marc
*Attorney, Agent, or Firm*—Pillsbury Madison & Sutro

[57] ABSTRACT

A method of storing data in an internal storage device included in a process controller for controlling a molding machine divides storage areas of the internal storage device hierarchically into a molding condition data storage area for storing molding condition data specific to a product or an operating environment, a changeable machine data storage area for storing changeable machine data specific to the molding machine and necessary for setting operating conditions and subject to change when necessary, and an unchangeable machine data storage area for storing unchangeable machine data specific to the molding machine. The molding condition data storage area, the changeable machine data storage area, and the unchangeable machine data storage area can selectively be initialized individually or in an optional combination.

6 Claims, 2 Drawing Sheets

METHOD OF STORING DATA IN INTERNAL STORAGE DEVICE IN A MOLDING MACHINE CONTROLLER AND INTERNAL STORAGE DEVICE CARRYING OUT THE SAME METHOD

BACKGROUND OF THE INVENTION

1. Field of the Invention

The present invention relates to a method of storing data in an internal storage device included in a process controller for a machine, such as an injection molding machine or the like, and to an internal storage device carrying out the method. More particularly, the present invention relates to a method of storing data in an internal storage device which stores data in divided storage areas so that a user can easily change data that are specific to the machine when necessary.

2. Description of the Related Art

A process controller of an injection molding machine or a die casting machine controls a series of operations including a mold closing operation and an injection molding operation. The process controller reads molding condition data stored in a storage device and controls the injection rate, injection pressure, screw speed, screw back pressure, mold opening and closing speed and heater temperature, etc.

The process controller of an injection molding machine has an internal storage device including a PROM and a RAM, and an external storage device which is optionally employed for writing data of molding conditions into a store in a batch.

The internal storage device stores programs and parameters. The parameters include molding condition data such as speed, pressure, temperature, position and time data, necessary for controlling process conditions, and history data including records of operations of the injection molding machine and molding condition setting histories, and data relating to characteristic values specific to the injection molding machine including the parameters of the control system.

The molding condition data are to be set by a user, and are changeable because different molds and different resins need different molding conditions.

The parameters of the control system are data specific to the injection molding machine and are not subject to change from initial setting values.

In a memory of a process controller, it is usual to store the molding condition data, the history data and the machine specific data in that order into three-level hierarchical storing areas from low-level addresses upward, respectively.

Some data which are substantially specific machine parameters are stored in the memory as the molding condition data.

PID parameters are examples of this kind. When controlling the temperature of the barrel heater of an injection molding machine by PID actions, an actuating signal is controlled by comparison of a set value and a feedback value. Since the set parameters for PID actions are those representing the characteristics of a control system, the set parameters for PID action are regarded as parameters to the injection molding machine rather than the mere molding condition data. On the other hand, the set parameters have the attribute of molding condition data which needs to be changed when mechanical specifications of the injection molding machine or the resin is changed. Therefore, the set parameters for PID actions are set not so much as specific machine data but as molding condition data in the conventional way.

Similarly, a printer connected to the controller that prints out the set data has printer setting parameters unique to its type.

In addition, the manufacturer of an injection molding machine carries out prescribed performance tests to verify the performance of the injection molding machine before shipment. After finishing the performance test, data used for the test must be cleared for initialization to delete memory contents for shipment. If the molding condition data includes set PID parameters, the set PID parameters are deleted through initialization. The set PID parameters are to be reentered by a manual operation into the internal storage device.

There is a case where the initialization for the data is required due to a malfunction of the molding machine. In this case, the memory contents of the machine specific data are deleted, and the same data must be restored in the storage device.

If the set PID parameters are not included in the molding condition data but in the machine specific data, the user is obliged to rely upon a service engineer to change the set PID parameters, because the storage area allocated for the machine specific data is not accessible to the user.

Since the machine specific data are not to be accessible to the user in a conventional process controller, when the user wants to reset the contents of memory storing machine specific data, the user can not select the machine specific data exclusively for the initialization. In such a case, the molding condition data stored in the low-level storage areas available to the user are initialized with the machine specific data at the same time. Therefore, when initializing the internal storage device, the molding condition data must temporarily be transferred to an external storage device, otherwise the molding condition data is deleted. Generally, an abnormal condition that requires resetting of stored machine specific data does not allow an opportunity to store the molding condition data in the external storage device. Therefore, the molding condition data cannot be stored in the external storage device and is bound to disappear. To make the system return to the normal condition, all the molding condition data needs to be reentered.

SUMMARY OF THE INVENTION

Accordingly, it is an object of the present invention to solve the foregoing problems in the prior art and to provide a method of storing data in an internal storage device, which facilitates an operation for reentering necessary data in the course of the initialization for data stored in the internal storage device.

According to one aspect of the present invention, there is provided a method of storing data in an internal storage device included in a process controller for controlling a molding machine, said method comprising:

hierarchically dividing storage areas of the internal storage device into a first storage area for storing molding condition data changeable according to a product or an operating environment, a second storage area for storing changeable machine data specific to the molding machine and necessary for setting operating conditions and subject to change according to a specification of the molding machine when necessary, and a third storage area for storing unchangeable machine data which are specific to the molding machine; and storing the molding condition data in the first storage area, the changeable machine data in the second storage area, and the unchangeable machine data in the third storage area.

According to the invention, these storage areas can selectively be initialized individually or in an optional combination.

Another object of the present invention is to provide a storage device capable of storing data by a method capable of storing data therein so that data can be initialized so as to facilitate an operation for reentering necessary data.

According to one aspect of the present invention, an internal storage device has a memory of hierarchical storage architecture for a molding machine controller, said storage architecture comprising:

a first storage area allocated for storing molding condition data which is set for each product or an operating condition;

a second storage area allocated for storing changeable machine data necessary for operation of the molding machine and capable of being changed according to a specification of the molding machine when necessary; and a third storage area allocated for storing unchangeable machine data which are specific to the molding machine and fixed in value for operation of the molding machine.

In a preferred embodiment, the first storage area has a storage area allocated for storing molding condition data necessary for setting molding conditions and a storage area allocated for storing history data on the mode of operation of a molding machine. The second storage area is assigned to storing machine specific data accessible to the user, such as set PID parameters for controlling the temperature of a barrel heater included in the molding machine. The third storage area has a program storage area allocated for storing programs for controlling the operation of the molding machine and a data storage area allocated for storing machine specific data which are specific to the molding machine and inaccessible to the user.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

Figure 1:
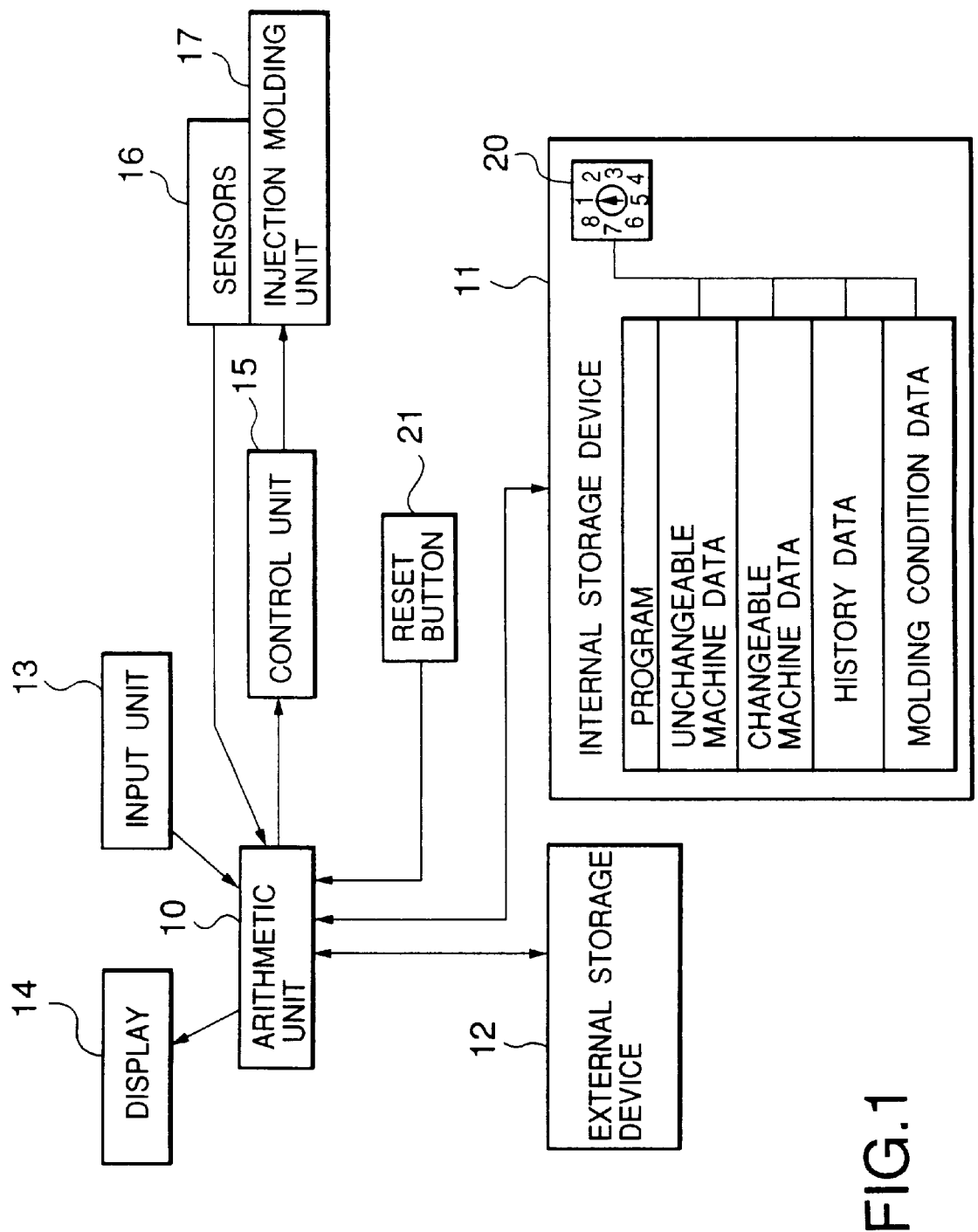
FIG. 1 is a block diagram of a process controller for controlling the operation of an injection molding machine and for carrying out a method of storing data in an internal storage device, acceding to a preferred embodiment of the present invention.

FIG. 1 shows a process controller included in an injection molding machine that includes an injection molding unit 17, to carry out a method of storing data in an internal storage device in a preferred embodiment of the present invention. The process controller comprises an arithmetic unit 10, as a principal component, an internal storage device 11, an external storage device 12, an input device 13, such as a keyboard, a display 14, such as a CRT display or a printer, and a control unit 15.

The arithmetic unit 10 is a microprocessor which executes programs stored in the internal storage device 11. The arithmetic unit 10 reads necessary data for controlling the injection molding unit 17 from the internal storage device 11 in response to commands given thereto by the programs. The arithmetic unit 10 also receives operating condition signals provided by sensors 16, such as injection rate, injection pressure, screw rotating speed, screw back pressure, movable platen moving speed and barrel heater temperature. The arithmetic unit 10 processes the input data and signals to deliver control signals to the control unit 15. The control unit 15 controls actuators included in the injection molding unit 17 according to the control signals so that the injection molding unit 17 operates in the prescribed molding conditions.

The internal storage device 11 comprises a ROM (read-only memory) and a RAM (random-access memory). The internal storage device 11 stores data in the following hierarchical storage architecture allocated according to the content of the data. The address space of the internal storage device 11 is divided, from a low level upward, into a molding, condition data storage area, a history data storage area, a changeable machine data storage area for storing machine specific data that is accessible to the user, and unchangeable machine data storage area for storing machine specific data inaccessible to the user.

The molding condition data includes injection rate, injection pressure, screw rotating speed, screw back pressure and such data, which are determined for each product by the user. The history data are information on molding operation histories relating to changes of the set molding conditions, and running histories, such as stoppage of the injection molding machine and generation of an alarm. The history data are put into the history data storage area whenever an occasion arises. The history data have molding information in common with the molding condition data.

The changeable machine data as one kind of parameters for the control system are data which are accessible to the user and data which represent inherent characteristics of the molding machine. The changeable machine data include data such as set PID parameters for the PID control of, for example, the temperature of a barrel heater and set values for a printer that provides a list of molding conditions and results of monitoring. The changeable machine data arc not necessarily to be changed for every different molding, but the user may change the value so as to accommodate a mechanical modification added to the molding machine, if necessary.

The unchangeable machine data which are the other kind of parameters for the control system are parameters specific to the molding machine and inaccessible to the user. The unchangeable machine data are determined by the manufacturer when optional functions are added to the molding machine. The determined value of the unchangeable machine data is not subject to user's modification. Unchangeable machine data have a nature specific to the machine in common with the program data.

Thus the data are stored in the foregoing hierarchical storage structure. Element 20 is an initialization selecting switch. When restoring storedd contents to initial values, or initializing data to reset stored contents, the initialization selecting switch 20 enables the user to select any one of the storage areas or an optional combination of the selected storage areas. A reset button 21 is pushed to carry out the initialization for the data stored in the selected storage area or combination of selected storage areas. The reset button 21 commences executing a program for the initialization to restore the selected data to the initial values or to clear selected data.

A procedure for initializing data stored in the internal storage device will be described hereinafter. A first example is a procedure for initializing the molding condition data and history data stored during the performance test of the injection molding machine before shipment from the manufacturer. Numbers respectively representing the molding condition data and the history data (for example, 2 is assigned to the molding condition data, 3 is assigned to the history data) are selected by initialization selecting switch 20, and the reset button 21 is pushed. Consequently, the molding condition data are initialized and set to predetermined initial values specified in a program. The stored content of the history data are all cleared.

Even though the molding condition data are initialized, the set PID parameters which belong, to the changeable machine data are not initialized in combination with the molding condition data, because the level of the storage area storing the set PID parameters is different from that of the storage areas storing the molding condition data and the history data.

When replacing the programs with new programs, the unchangeable machine data are replaced with new values. In that case, only the selected unchangeable machine data can be initialized to delete stored content of the unchangeable machine data.

A second example for a procedure for initializing the changeable machine data conducted by the user will be described hereinafter.

When the mechanical specification of the injection molding machine is changed, the initialization of the set PID parameters according to the new specification is carried out. The user selects the changeable machine data by operating the initialization selecting switch 20, and the selected changeable machine data are initialized to reset the contents of the changeable machine data storage area.

In this embodiment, the changeable machine data includes indispensable machine specific values which can be changed by the user.

Figure 2:
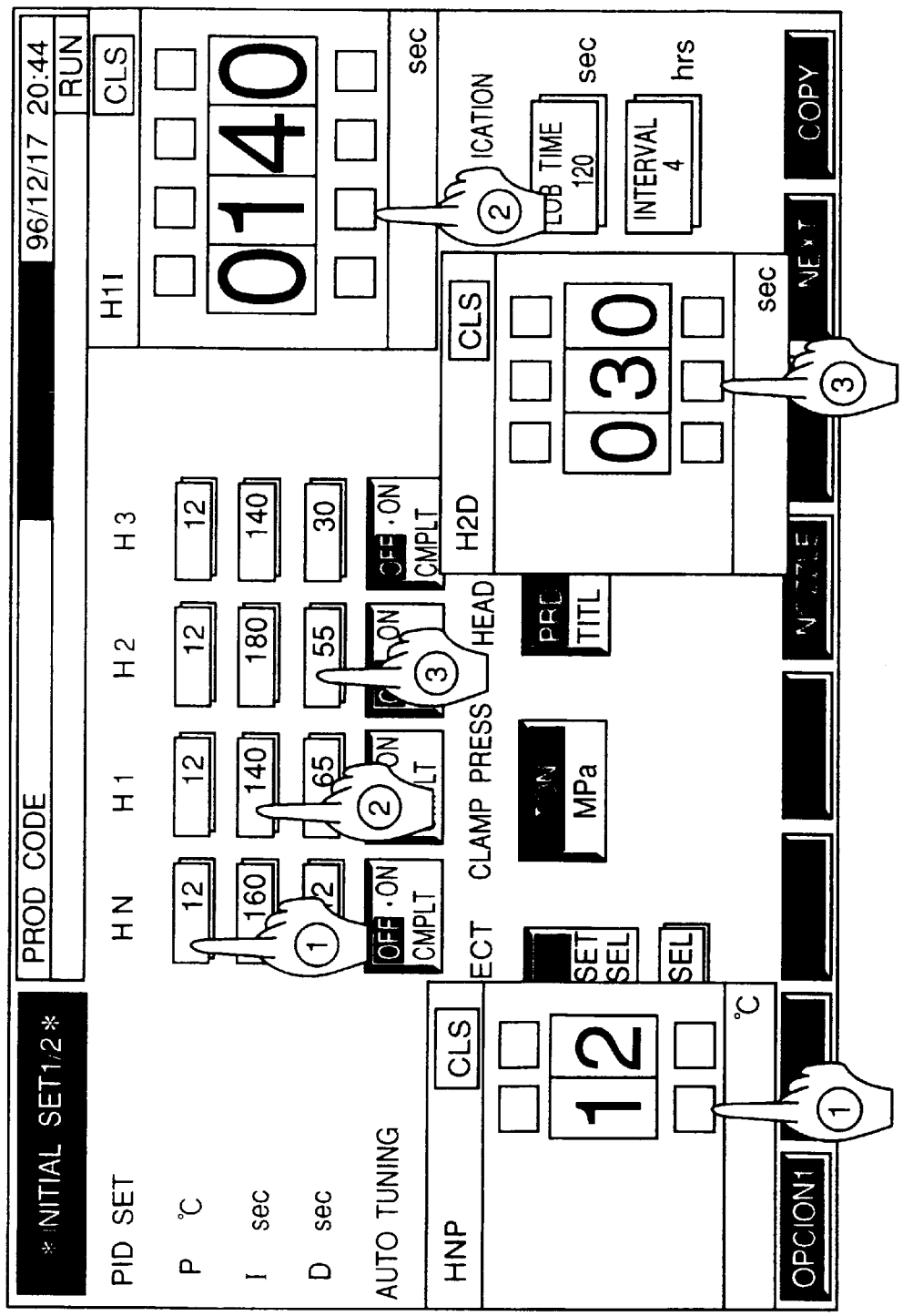
FIG. 2 is a view of a screen displaying a set PID parameter changing menu for changing set PID parameters.

FIG. 2 shows a parameter setting menu showing the set PID parameters necessary for the control of the temperature of the barrel heater. The set values for the PID parameters are displayed in a setting menu on the screen of the display 14. The screen of the display 14 is provided with a touch-sensitive panel which is attached above the screen. When a block for an item to be changed is specified, a data input window appears on the screen, and then the keys displayed in the data input window are operated to enter a set value.

In FIG. 2, fingers with numbers refer to blocks for data items, and numbers corresponding to the numbers of said fingers refer to the data input windows, respectively. The set PID parameters can be changed without initializing for the changeable machine data by using a setting menu similar to the setting menu shown in FIG. 2.

In the conventional internal storage device, the set PID parameters are stored as data classified as molding condition data. Therefore, the many set PID parameters need to be entered again after the initialization of the molding condition data. It requires the user to perform troublesome data entering operations. In this embodiment, data can be reentered after initialization and data can be changed by simple operations.

When malfunctions of the injection molding machine occurred during an injection molding operation, the causes of malfunctioning need to be identified by checking the history data. The history data will be initialized after the causes have been eliminated, because the history data have no further use. In such as case, only the history data can be selected and initialized exclusively.

As is apparent from the foregoing description, according to the present invention, the changeable data to be set by the user for each product or each operating condition, such as molding condition data and history data, unchangeable machine data representing the inherent characteristics of the molding machine, which is inaccessible to the user, and changeable machine data which need not be changed for each product but can be changed when necessary are stored in different storage areas having a hierarchical storage architecture, and the data can be selectively initialized. Accordingly, the user is able to initialize the selected data such as PID parameters easily and to restore necessary data as well. As for the manufacturer, bothersome work necessary for the initialization and reentry of data after performance test conducted before shipment can be facilitated.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A method of storing data in an internal storage device included in a process controller for controlling a molding machine, said method comprising:

hierarchically dividing storage areas of the internal storage device into a first storage area for storing molding condition data changeable according to a product or an operating environment, a second storage area for storing changeable machine data which are specific to the molding machine but changeable according to a specification of the molding machine, and a third storage area having a program storage area allocated for storing programs for controlling the operation of the molding machine and a data storage area allocated for storing unchangeable machine specific data which are specific to the molding machine and inaccessible to a user;

selectively initializing the first storage area, the second storage area and the third storage area individually or in an optional combination of storage areas; and storing the molding condition data in the first storage area, the changeable machine data in the second storage area, and the unchangeable machine data in the third storage area.

2. The method of storing data in an internal storage device according to claim 1, wherein the data stored in the first storage area include data necessary for setting injection molding conditions and data on the histories of operations of an injection molding machine or past molding conditions.

3. The method of storing data in an internal storage device according to claim 1, wherein the data stored in the second storage area include data accessible to a user, including a set PID parameter for controlling the temperature of a barrel heater of an injection molding machine.

4. An internal storage device having a memory of hierarchical storage architecture for a controller of a molding machine, said storage architecture comprising:

a first storage area allocated for storing molding condition data which is set for each product or for an operating condition;

a second storage area allocated for storing changeable machine data necessary for and capable of being changed according to a specification of the molding machine when necessary;

a third storage area having a program storage area allocated for storing programs for controlling the operation of the molding machine and a data storage area allocated for storing unchangeable machine specific data which are specific to the molding machine and inaccessible to a user; and an initialization selecting means for selecting the first storage area, the second storage area and the third storage area individually or in an optional combination to initialize the data stored.

5. The internal storage device included in a molding machine controller according to claim 4, the first storage area has a storage area allocated for storing molding conditions data necessary for setting injection molding condition and a storage area allocated for storing data on histories of operations of an injection molding machine and past molding conditions.

6. The internal storage device included in a molding machine controller according to claim 4, wherein the second storage area is allocated for storing changeable machine data accessible to a user and including a set PID parameter for controlling the temperature of a barrel heater of an injection molding machine.

* * * * *